(12) United States Patent
Goenka et al.

(10) Patent No.: US 11,863,504 B2
(45) Date of Patent: *Jan. 2, 2024

(54) COMMUNICATION WITH SERVICE PROVIDERS USING DISPOSABLE EMAIL ACCOUNTS

(71) Applicant: Yahoo Assets LLC, Dulles, VA (US)

(72) Inventors: Mohit Goenka, Santa Clara, CA (US); Ashish Khushal Dharamshi, Sunnyvale, CA (US); Nikita Varma, Milpitas, CA (US); Gnanavel Shanmugam, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,346

(22) Filed: Sep. 2, 2022

(65) Prior Publication Data

US 2022/0417188 A1   Dec. 29, 2022

Related U.S. Application Data

(63) Continuation of application No. 16/215,721, filed on Dec. 11, 2018, now Pat. No. 11,438,284.

(51) Int. Cl.
*H04L 51/04* (2022.01)
*H04L 67/306* (2022.01)
*H04L 67/52* (2022.01)

(52) U.S. Cl.
CPC ............ *H04L 51/04* (2013.01); *H04L 67/306* (2013.01); *H04L 67/52* (2022.05)

(58) Field of Classification Search
CPC ... G06F 16/9535; H04L 69/329; H04L 67/10; H04L 67/52; H04L 51/52; H04L 67/02; H04L 67/535; H04L 51/04; H04L 67/306; G06Q 50/01

See application file for complete search history.

(56) References Cited

U.S. PATENT DOCUMENTS 7,558,829 B1 * 7/2009 Perlman ................ H04L 51/212
709/206
8,141,150 B1 * 3/2012 Krishnamurthy ... H04L 63/1483
726/22

(Continued)

*Primary Examiner* — Ninos Donabed
(74) *Attorney, Agent, or Firm* — Cooper Legal Group LLC

(57) ABSTRACT

One or more computing devices, systems, and/or methods for facilitating communications with service providers using disposable email addresses (DEAs) are provided. A first email, associated with a requested service, may be received from an email account. A set of service providers may be determined based upon the requested service. A DEA corresponding to the email account may be generated. A second email, comprising an indication of the DEA, may be generated based upon the first email. The second email may be transmitted to a set of email accounts associated with the set of service providers. Emails received from the set of email accounts that are addressed to the DEA may be transmitted to the email account. Responsive to receiving a request to deactivate the DEA from a device associated with the email account and/or responsive to determining that the requested service is completed, the DEA may be deactivated.

20 Claims, 13 Drawing Sheets

(56) References Cited

U.S. PATENT DOCUMENTS

| | | | | |
|---|---|---|---|---|
| 8,949,325 B1* | 2/2015 | Hernacki | ................ | H04L 9/32 709/204 |
| 9,847,973 B1* | 12/2017 | Jakobsson | ........... | H04L 63/1433 |
| 10,839,066 B1* | 11/2020 | Pham | ................ | G06F 21/40 |
| 11,176,268 B1* | 11/2021 | Kats | ................ | H04L 63/102 |
| 11,438,284 B2* | 9/2022 | Goenka | ................ | H04L 67/52 |
| 2005/0210107 A1* | 9/2005 | Mora | ................ | H04L 51/48 709/206 |
| 2005/0228996 A1* | 10/2005 | Mayer | ................ | H04N 1/32771 713/170 |
| 2006/0041621 A1* | 2/2006 | Libbey | ................ | H04L 51/48 709/206 |
| 2007/0157291 A1* | 7/2007 | Chua | ................ | H04L 63/0807 726/4 |
| 2010/0005509 A1* | 1/2010 | Peckover | ............ | H04L 63/0281 726/3 |
| 2010/0036925 A1* | 2/2010 | Haffner | ............... | H04L 43/0876 709/206 |
| 2010/0077053 A1* | 3/2010 | Haffner | ................ | H04L 51/48 709/206 |
| 2010/0106645 A1* | 4/2010 | Peckover | ................ | H04L 63/12 705/50 |
| 2010/0138925 A1* | 6/2010 | Barai | ................ | H04L 63/1433 726/25 |
| 2010/0257359 A1* | 10/2010 | Currie | ................ | H04L 63/1466 713/168 |
| 2011/0276590 A1* | 11/2011 | Hayes | ................ | G06Q 10/107 707/769 |
| 2012/0089835 A1* | 4/2012 | Peckover | ................ | H04L 63/12 713/168 |
| 2013/0097085 A1* | 4/2013 | Peckover | ................ | H04L 63/12 705/50 |
| 2013/0144951 A1* | 6/2013 | Viswanath | ............ | H04L 67/306 709/204 |
| 2014/0047043 A1* | 2/2014 | Esfahani | ............ | G06Q 10/107 709/206 |
| 2016/0004852 A1* | 1/2016 | McEvoy | ................ | G06F 21/31 726/7 |
| 2019/0379660 A1* | 12/2019 | Thirumavalavan | ... | H04L 51/046 |

* cited by examiner

EMAIL HEADER

FROM: <SAM-B-<SAMMY_B@EXAMPLEEMAIL.COM>
SUBJECT: RE: Kitchen Remodeling
TO: KITCHEN-KITCHEN@EXAMPLEEMAIL.COM
RETURN-PATH: <SAMMY_B@EXAMPLEEMAIL.COM>
. . .

EMAIL BODY

Thanks for sending the information. I would like to go with the deluxe package.

Wednesday sounds great. I'll see you then!

Thanks,

Sam

566

EMAIL HEADER

FROM: <6234@EXAMPLEEMAIL.COM>
SUBJECT: RE: Kitchen Remodeling
TO: KITCHEN-KITCHEN@EXAMPLEEMAIL.COM
RETURN-PATH: <6234@EXAMPLEEMAIL.COM>
. . .

EMAIL BODY

Thanks for sending the information. I would like to go with the deluxe package.

Wednesday sounds great. I'll see you then!

Thanks,

Sam

526 — SERVICE PROVIDER 1
KITCHEN-KITCHEN@EXAMPLEEMAIL.COM

COMMUNICATION WITH SERVICE PROVIDERS USING DISPOSABLE EMAIL ACCOUNTS

RELATED APPLICATION

This application claims priority to and is a continuation of U.S. application Ser. No. 16/215,721, filed on Dec. 11, 2018, entitled "COMMUNICATION WITH SERVICE PROVIDERS USING DISPOSABLE EMAIL ACCOUNTS", which is incorporated by reference herein in its entirety.

BACKGROUND

People are often faced with issues (e.g., a pipe bursting at a person's home, a lighting system ceasing to work, a person wanting to install a lamp, a person having internet connection issues, etc.) which may require a person to seek service providers that can perform services related to the issues. For example, a first user may want to remodel a kitchen. The first user may want to find various service providers related to kitchen remodeling and/or may want to be provided with service information and/or quotes from the various service providers. Identifying the various service providers may be a difficult and/or time-consuming process for the user. Further, the first user may be required to provide personal information (e.g., email address, phone number, mailing address, etc.) in order to receive service information, quotes, etc. from the various service providers. However, as a result of providing the personal information, the personal information may be disclosed to entities without the first user's permission and/or the personal information may be misused. Also, the first user may receive emails related to the various service providers, comprising content the first user does not have an interest in, for an extended period of time (e.g., even after services that the first user wanted are completed).

SUMMARY

In accordance with the present disclosure, one or more computing devices and/or methods are provided. In an example, a first email may be received from a first email account. The first email may comprise an indication of a first email address associated with the first email account. A requested service associated with the first email may be determined. A set of service providers may be determined based upon the requested service. A first disposable email address (DEA), corresponding to the first email account and/or in association with the requested service, may be generated. A second email may be generated based upon the first email. The second email may comprise an indication of the first DEA. The second email may be transmitted to a set of email accounts. Each email account of the set of email accounts may be associated with a service provider of the set of service providers associated with the requested service. A third email, addressed to the first DEA, may be received from a second email account associated with a first service provider of the set of service providers associated with the requested service. The third email may be transmitted to the first email account. A request to deactivate the first DEA may be received from a client device associated with the first email account. Responsive to receiving the request to deactivate the first DEA, the first DEA may be deactivated.

In an example, a first message may be received from a first client device. A requested service associated with the first message may be determined. A set of service providers may be determined based upon the requested service. A first DEA, corresponding to the first client device and/or in association with the requested service, may be generated. A first email may be generated based upon the first message. The first email may comprise an indication of the first DEA. The first email may be transmitted to a set of email accounts. Each email account of the set of email accounts may be associated with a service provider of the set of service providers associated with the requested service. A second email, addressed to the first DEA, may be received from a first email account associated with a first service provider of the set of service providers associated with the requested service. A second message may be generated based upon the second email. The second message may be transmitted to the first client device. A request to deactivate the first DEA may be received from the first client device. Responsive to receiving the request to deactivate the first DEA, the first DEA may be deactivated.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5F is a component block diagram illustrating an example system for facilitating communications with service providers using DEAs, where a fifth email is generated based upon a fourth email and/or a first DEA corresponding to a first email account.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
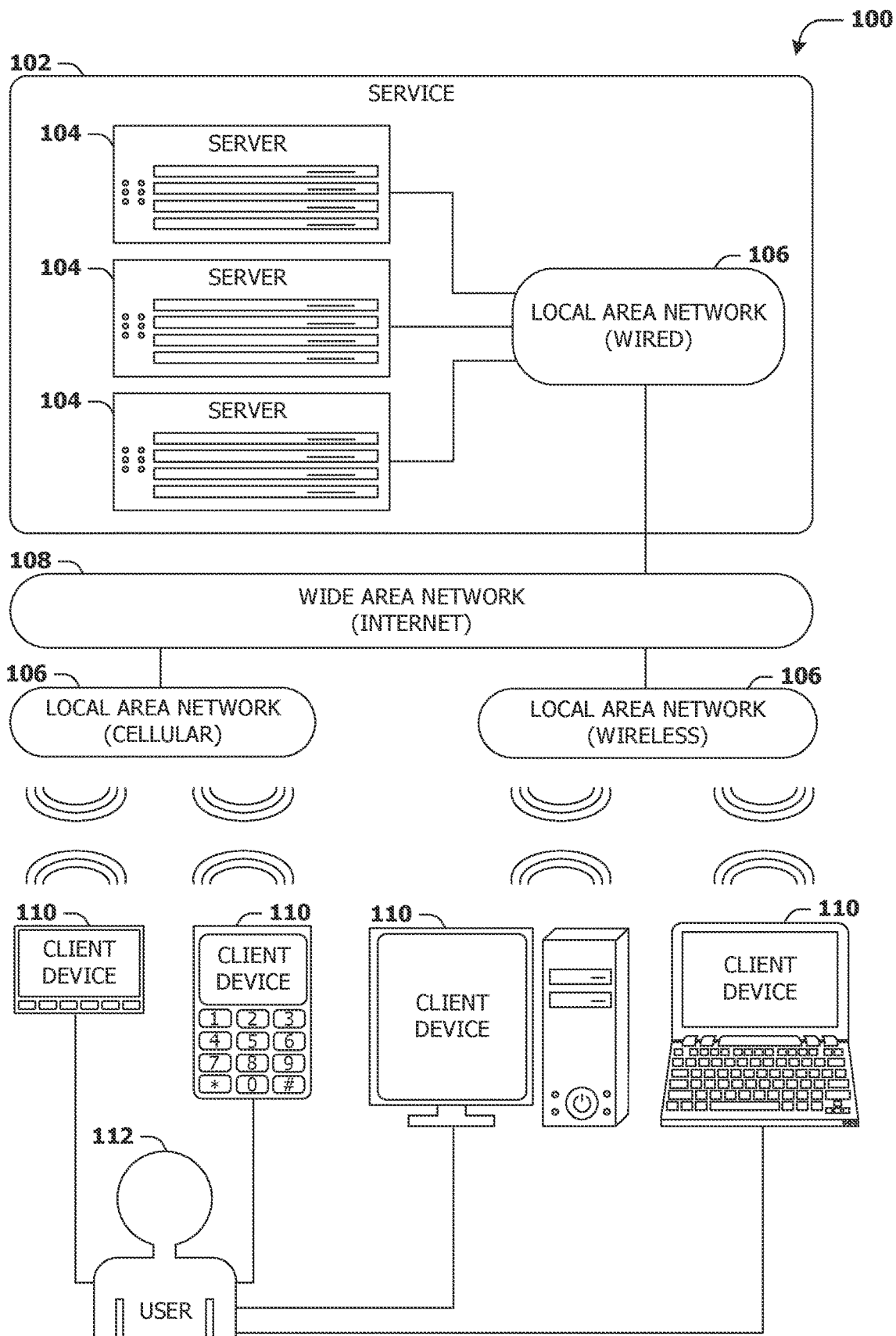
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
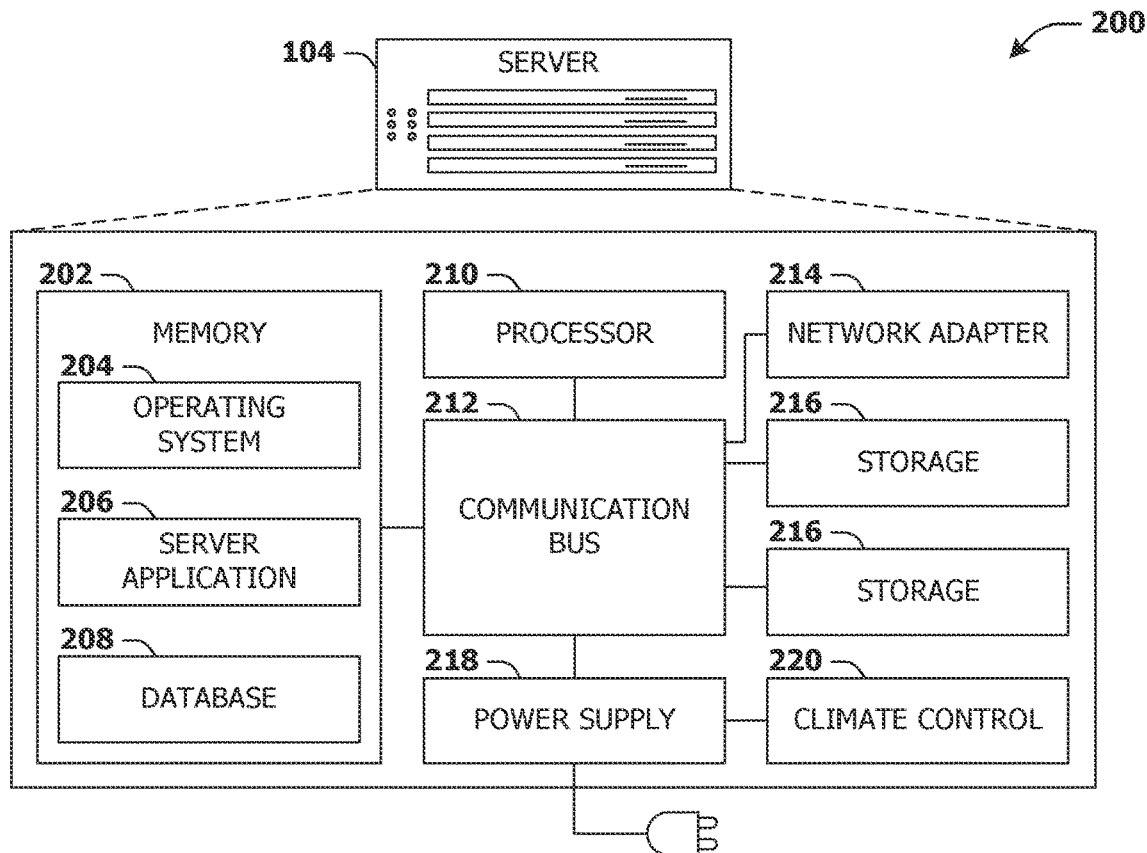
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
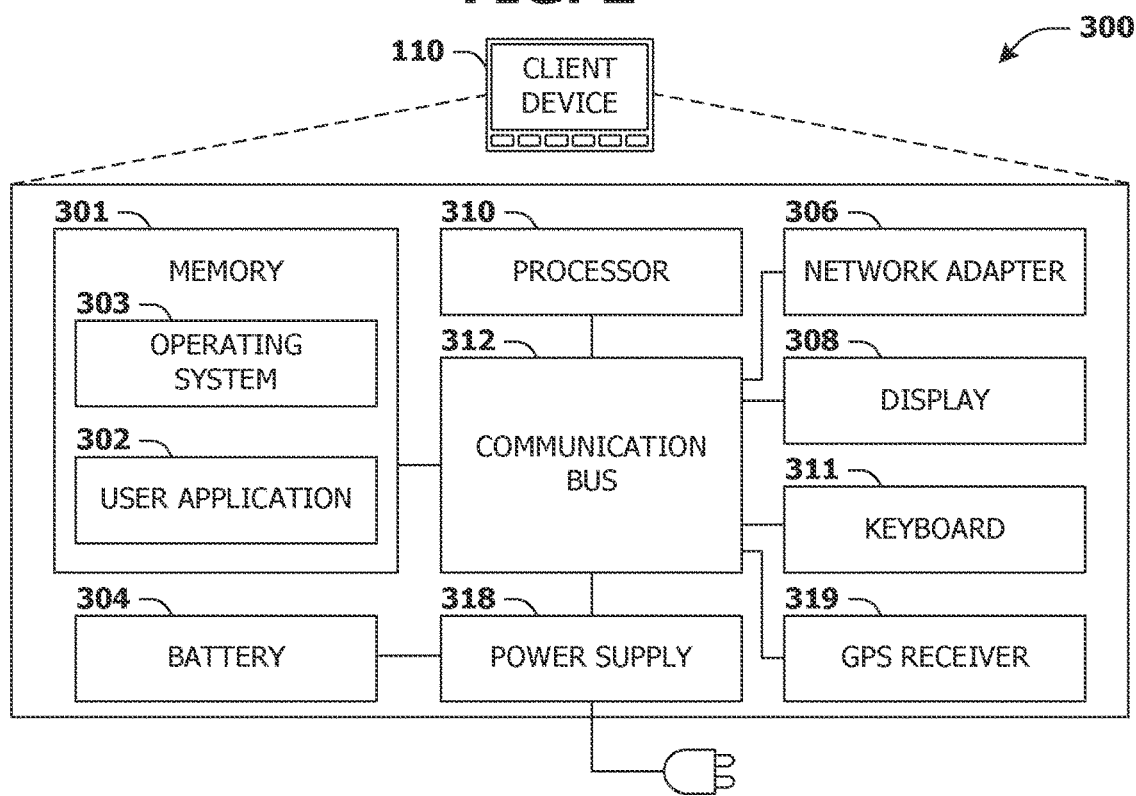
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for facilitating communications with service providers using disposable email addresses (DEAs) are provided. For example, a user may want one or more services to be performed (e.g., the user may want plumbing services for repairing a pipe, the user may want electrician services to have a lighting system installed, the user may want to modify an internet service such as an internet speed, etc.) which may require the user to seek service providers that can perform the one or more services. For example, the user may want to remodel a kitchen. The user may want to find a plurality of service providers related to kitchen remodeling and/or may want to be provided with service information (e.g., a quote, availability information associated with a service provider, capabilities of a service provider, etc.) from the plurality of service providers.

Finding and/or contacting the plurality of service providers may be a difficult and/or time-consuming process for the user (e.g., the user may need to search through a phone book, the user may need to perform searches using a search engine and/or navigate through web pages, etc.). Alternatively and/or additionally, the user may be required to provide personal information (e.g., email address, phone number, mailing address, etc.) to the plurality of service providers in order to receive the service information. Personal information associated with the user may be misused and/or used in ways the user does not approve (e.g., the personal information may be disclosed to entities without the user's permission, the personal information may be collected and/or used for directing promotional content to the user that the user does not have an interest in, an email account associated with the user may be subscribed to one or more subscription services without the user's permission, etc.). For example, the plurality of service providers may send emails to the email account associated with the user (e.g., using the email address) for an extended period of time.

In accordance with one or more of the techniques presented herein, a first email may be received from the email account associated with the user. For example, a requested service (e.g., home improvement, kitchen remodeling, plumbing service, etc.) may be determined based upon the first email. A set of service providers may (automatically) be determined based upon the requested service (and/or a location associated with the user). A DEA, corresponding to the email account may be generated. For example, the DEA may be used by the user and/or the set of service providers for email correspondences between the user and the set of service providers, where the user is not required to disclose the email address associated with the email account to the set of service providers.

For example, a second email may be generated based upon the first email. A sender address of the second email may comprise an indication of the DEA (where the email address of the email account may not be comprised within the second email). The second email may be transmitted to a set of email accounts associated with the requested service. Emails received from the set of email accounts that are addressed to the DEA may be transmitted to the first email account. Alternatively and/or additionally, sender address fields of emails composed using the email account and/or transmitted to email accounts of the set of email accounts may comprise indications of the DEA (rather than the email address of the email account). Responsive to receiving a request to deactivate the DEA from a device associated with the user and/or responsive to determining that the requested service is completed, the DEA may be deactivated.

Figure 4:
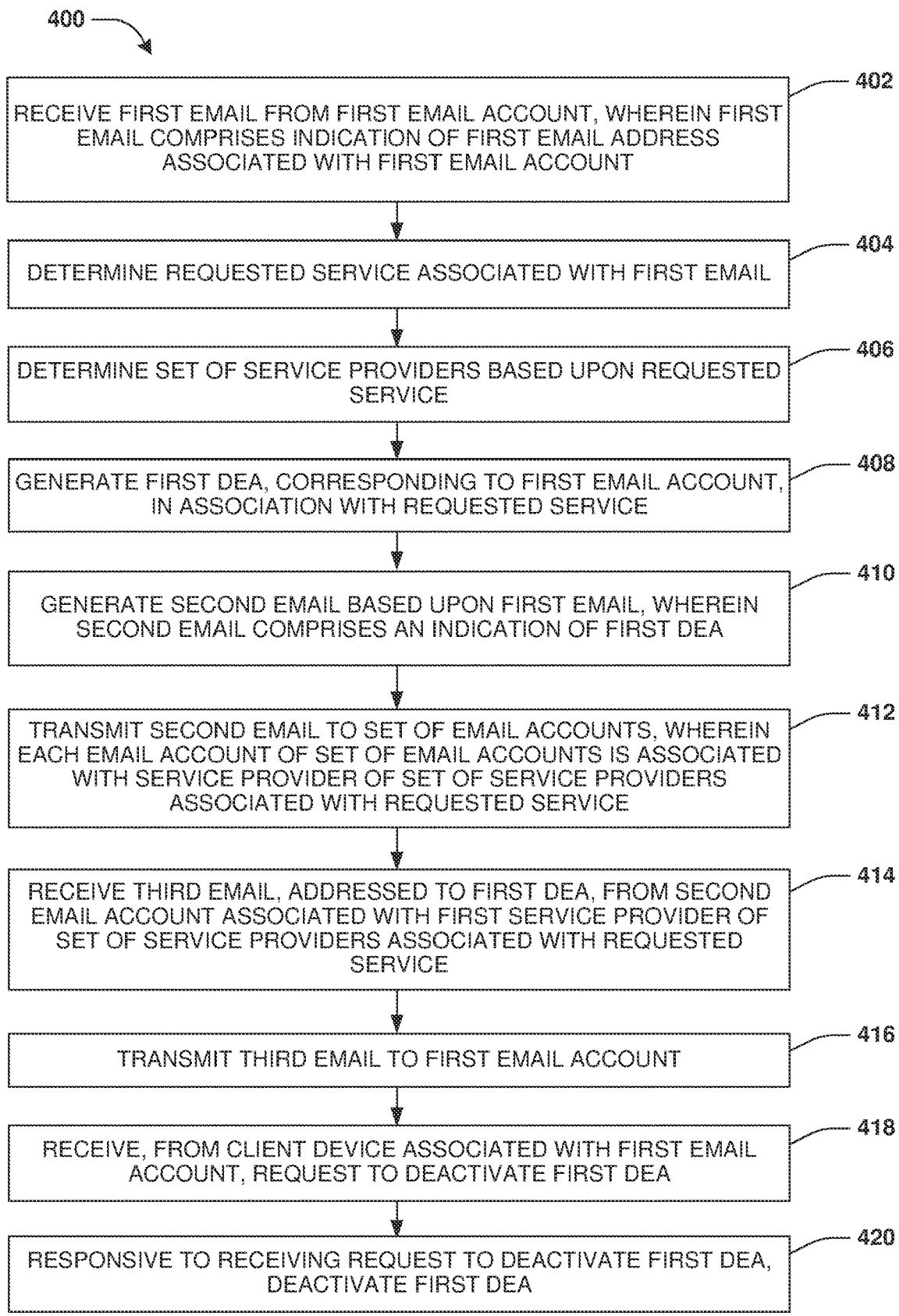
FIG. 4 is a flow chart illustrating an example method for facilitating communications with service providers using disposable email addresses (DEAs).

An embodiment of facilitating communications with service providers using DEAs is illustrated by an example method 400 of FIG. 4. A first user, such as user Jill, (e.g., and/or a first client device associated with the first user) may access and/or interact with a communication system (and/or an email system, messaging system, etc.) for sending and/or receiving emails and/or performing communications via messaging, voice calls, video calls, etc. For example, a first email account (and/or a different type of user account) of the first user with the communication system may be accessed and/or interacted with via a first email interface, such as an email client, a web email interface accessed via a browser, an email application, etc. on the first client device. In some examples, the communication system may be associated with an email service provider.

For example, the communication system may provide a service where emails (and/or other types of messages), associated with services that users want performed (e.g., catering services, internet services, home improvement and/or repair services, electrical services, etc.), may be transmitted to the communication system. The communication system may determine requested services associated with the emails, select service providers related to each requested service and/or may provide for communications between users and the service providers using DEAs such that users may communicate with the service providers without disclosing personal information (such as email addresses).

At 402, a first email may be received from the first email account. The first email may comprise one or more indications of a first email address (e.g., "jillhiggins@exampleemail.com") associated with the first email account. For example, the one or more indications of the first email address may be comprised within a first email header of the first email. For example, the first email header of the first email may comprise a plurality of email header fields, such as a first sender address field, a first subject field, a first date field, a first recipient address field, a first return-path field, a first delivery date field, etc. For example, the first sender address field may be indicative of a sender of the first email and/or may comprise the first email address and/or a sender name (e.g., the first sender email address field may comprise "From: Jill Higgins <jillhiggins@exampleemail.com>"). Alternatively and/or additionally, the first return-path field may be indicative of an email address for return mail (e.g., "Reply-To:") and/or may comprise the first email address (and/or a different email address) (e.g., the first return-path field may comprise "Return-Path: <jillhiggins@exampleemail.com>").

In some examples, the first email may comprise a first email body composed and/or drafted (by the first user) using the first email interface. For example, the first email body may comprise content (e.g., text, one or more images, etc.) related to a first requested service associated with the first email. For example, the first email body may comprise text, drafted using the first email interface, which may comprise a description of the first requested service. Alternatively and/or additionally, the first email body may comprise one or more images associated with the first requested service.

In a first example, the first user may want to have a plumber perform one or more plumbing services (e.g., fix a burst pipe, relocate a radiator, etc.). For example, the first email body may comprise text comprising a description of a burst pipe and/or a request to quote a price for one or more services to fix the burst pipe. Alternatively and/or additionally, the first email body may comprise one or more images of the burst pipe. In a second example, the first user may want to have a caterer to provide food service to an event venue for an event. For example, the first email body may comprise text comprising a description of desired foods and/or a request to quote a price for the desired foods.

In some examples, rather than receiving the first email, a service request message may be received from the first client device. For example, a service request interface may be displayed using the first client device. For example, the service request interface may be accessed via an app and/or the service request interface may be a web interface (accessed via a browser, for example). In some examples, the service request interface may comprise a first text field corresponding to an email address. For example, the first email address may be entered into the first text field. In some examples, it may be required that an email address entered into the first text field be associated with the communication system and/or the email service provider. Alternatively and/or additionally, it may not be required that an email address entered into the first text field be associated with the communication system and/or the email service provider.

Alternatively and/or additionally, the service request interface may comprise a second text field corresponding to text associated with the first requested service (e.g., a description of the first requested service). For example, text may be entered into the second text field. Alternatively and/or additionally, the service request interface may comprise a selectable list of services, wherein the first requested service may be selected from the selectable list of services. In some examples, the service request message, comprising the first email address and/or the text may be received from the first client device responsive to a selectable input of the service request interface being selected.

At 404, the first requested service associated with the first email may be determined. For example, the first requested service may be determined by analyzing the first email. For example, the first subject field, the first email body, etc. may be analyzed to determine the first requested service. For example, text of the email body and/or the first subject field may be compared with a plurality of services to determine whether the text of the email body and/or the first subject field comprises one or more words corresponding to a service of the plurality of services. For example, responsive to a determination that one or more words of the first subject field and/or the email body matches a service of the plurality of services, the service may be determined to be the first requested service.

Alternatively and/or additionally, the communication system may be associated with a plurality of service email addresses, wherein each email address of the plurality of service email addresses may correspond to a service topic of a plurality of service topics associated with the communication system. For example, the plurality of service email addresses may comprise a first service email address (e.g., "electricians@exampleemail.com") corresponding to a first service topic "electrician services", a second service email address (e.g., "internet@exampleemail.com") corresponding to a second service topic "internet services", a third service email address (e.g., "plumbing@exampleemail.com") corresponding to a third service topic "plumbing services", a fourth service email address (e.g., "homeimprovement@exampleemail.com") corresponding to a fourth service topic "home improvement services", etc.

Alternatively and/or additionally, the communication system may be associated with a plurality of sets of service sub-topics. For example, each set of service sub-topics of the plurality of sets of service sub-topics may correspond to a service topic of the plurality of service topics and/or an email address of the plurality of service email addresses. For example, a first set of service sub-topics (e.g., light bulb installation, computer cabling, broken switch repair, etc.) may correspond to the first service topic "electrician services".

In some examples, the first email may be transmitted by the first email account to a service email address of the plurality of service email addresses. For example, the first email may be received by the communication system via a service email address of the plurality of service email addresses. The first requested service may be determined based upon a service email address that the first email is addressed to. For example, if the first email is addressed to the first service email address (e.g., if the first email comprises the first service email address within the first recipient address field of the first email header) corresponding to the first service topic "electrician services", then the first requested service may be determined to be an electrician service.

In an example, the first email may be addressed to the fourth service email address "homeimprovement@exampleemail.com" (e.g., the first recipient address field of the first email header may comprise "homeimprovement@exampleemail.com"). The first requested service may be determined to be associated with the fourth service topic "home improvement services" based upon the first email being addressed to the fourth service email address. For example, the first requested service may be determined to be a home improvement service based upon the first email being addressed to the fourth service email address.

The first email body (e.g., "I live on Mountain View Rd. and I want to remodel my kitchen") and/or the first subject field (e.g., "Kitchen Remodeling") may be analyzed to identify a service sub-topic of the fourth service topic that is associated with the first requested service. For example, the first email body may be analyzed to determine that the first requested service is associated with a first service sub-topic "kitchen remodeling services" of a set of service sub-topics associated with the fourth service topic. For example, the first requested service may be determined to be a kitchen remodeling service based upon the first email body and/or the first subject field.

At 406, a set of service providers may be determined based upon the first requested service. For example, the set of service providers may be selected from a database of service providers associated with the communication system. The database of service providers may comprise indications of a plurality of service providers. Alternatively and/or additionally, the database of service providers may comprise a plurality of sets of service provider information corresponding to the plurality of service providers. Each set of service provider information may correspond to a service provider of the plurality of service providers. For example, a set of service provider information may comprise one or more of a list of services provided by a service provider of the plurality of service providers, one or more ratings (e.g., customer ratings) associated with the service provider, a name of the service provider, an address of the service provider, an email address associated with the service provider, a location associated with the service provider (e.g., a geolocation associated with the service provider comprising a set of coordinates (e.g., longitude and/or latitude coordinates) corresponding to the service provider), a service region in which the service provider provides services, a telephone number associated with the service provider, a website associated with the service provider, company information associated with the service provider, etc.

In some examples, the set of service providers may be selected from the plurality of service providers based upon one or more client locations associated with the first user and/or the first email account. For example, the one or more client locations may correspond to a first geolocation associated with the first client device. For example, the one or more client locations may be determined based upon location information associated with the first client device received from a wireless network (e.g., a WiFi network, a hotspot, a wireless access point (WAP), a network associated with a base station, etc.) that the first client device is connected to. The location information may comprise received signal strength indicators (RSSIs) associated with communications between the first client device and the wireless network. Alternatively and/or additionally, the location information may comprise angle of arrival (AoA) information. One or more RSSI localization techniques and/or one or more trilateration techniques may be performed using the RSSIs and/or the AoA information to determine the one or more client locations of the first client device.

Alternatively and/or additionally, the location information may comprise satellite navigation information comprising longitude measurements, latitude measurements and/or altitude measurements associated with locations of the first client device. The satellite navigation information may be received from a satellite navigation system, such as a global navigation satellite system (GNSS) (e.g., Global Positioning System (GPS), Global Navigation Satellite System (GLONASS), Galileo, etc.). In some examples, the one or more client locations of the first client device (and/or the first user) may be determined based upon merely the satellite navigation information. Alternatively and/or additionally, the one or more client locations may be determined based upon a combination of the satellite navigation information, the AoA information and/or the RSSIs.

Alternatively and/or additionally, the one or more client locations may be determined based upon email activity of the first email account. For example, emails of the first email account may be analyzed to determine a home location, a work location, etc. associated with the first user and/or the first email account. Alternatively and/or additionally, the one or more client locations may be determined based upon search activity associated with the first client device. For example, queries used to perform searches (using a search engine) may be analyzed to determine one or more locations associated with the queries. Alternatively and/or additionally, the one or more client locations may be determined based upon social media activity associated with the first email account and/or the first client device. For example, social media posts associated with the social media activity and/or a social media profile associated with the first email account may be analyzed to determine the home location, the work location, etc.

In some examples, the one or more client locations may be stored in a user profile associated with the first email account. Alternatively and/or additionally, the user profile may comprise historical data corresponding to previous emails transmitted to the communication system associated with requested services. For example, the historical data may comprise indications of the requested services and/or indications of service providers that performed the requested services. Alternatively and/or additionally, the user profile may comprise a user telephone number associated with the first user, a home address associated with the first user, etc.

In some examples, a service provider may be selected from the plurality of service providers for inclusion in the set of service providers based upon a determination that a location of the service provider is within a threshold distance (e.g., 10 miles, 100 miles, etc.) from a location of the one or more client locations (e.g., the home location, the work location, a location of the first client device, etc.). For example, the location of the service provider may be determined based upon a set of service provider information associated with the service provider (e.g., an address of the service provider and/or a geolocation associated with the service provider).

Alternatively and/or additionally, a service provider may be selected from the plurality of service providers for inclusion in the set of service providers based upon a determination that a location of the one or more client locations is within a service region associated with the service region. For example, the service region may correspond to a region in which the service provider provides services. For example, the service region may comprise an indication of one or more of one or more cities, one or more zip codes, one or more states, etc. The service provider may be selected from the plurality of service providers for inclusion in the set of service providers based upon a determination that a location of the one or more client locations is within one or more of the one or more cities, the one or more zip codes, the one or more states, etc., which may be determined based upon the user address. Alternatively and/or additionally, the service region may comprise a geometrical representation of geographical boundaries of a region in which the service provider provides services. For example, the service provider may be selected from the set of service providers for inclusion in the set of service providers based upon a determination that a location of the one or more client locations is within the geographical boundaries of the service region.

Alternatively and/or additionally, a service provider may be selected from the plurality of service providers for inclusion in the set of service providers based upon a determination that an area code of a telephone number associated with the service provider matches an area code of the user telephone number associated with the first user.

Alternatively and/or additionally, the plurality of sets of service provider information may be analyzed based upon the first requested service. For example, lists of services associated with the plurality of service providers may be analyzed based upon the first requested service. The first requested service may be compared with the lists of services associated with the plurality of service providers to identify lists of services associated with service providers that comprise a service matching (and/or related to) the first requested service. For example, a service provider may be selected for inclusion in the set of service providers responsive to a determination that a list of services associated with the service provider comprises one or more services matching (and/or related to) the first requested service.

In an example, the first requested service may be a kitchen remodeling service. An exemplary service provider may be selected for inclusion into the set of service providers responsive to a determination that a list of services associated with the exemplary service provider comprises "home improvement services" (e.g., the exemplary service provider may be selected based upon a determination that the kitchen remodeling service is related to home improvement services). Alternatively and/or additionally, an exemplary service provider may be selected for inclusion into the set of service providers responsive to a determination that a list of services associated with the exemplary service provider comprises "kitchen remodeling services" (e.g., the exemplary service provider may be selected based upon a determination that the kitchen remodeling service matches kitchen remodeling services).

In some examples, names of service providers (e.g., company names, store names, etc.) associated with the plurality of service providers may be analyzed based upon the first requested service. The first requested service may be compared with the names of service providers associated with the plurality of service providers to identify service providers of the plurality of service providers having names that match (and/or are related to) the first requested service. For example, a service provider may be selected for inclusion in the set of service providers responsive to a determination that a name associated with the service provider matches (and/or is related to) the first requested service. In an example, the first requested service may be a plumbing service. An exemplary service provider may be selected for inclusion in the set of service providers responsive to a determination that a service provider name of the exemplary service provider is "JJ's Plumbing Services" (e.g., the exemplary service provider may be selected based upon a determination that "JJ's Plumbing Services" is related to the plumbing service).

In some examples, service providers may be selected for inclusion in the set of service providers based upon ratings (e.g., customer ratings) associated with the plurality of service providers. For example, a service provider may be selected for inclusion in the set of service providers responsive to a determination that a rating associated with the service provider is higher than a threshold rating.

At 408, a first DEA corresponding to the first email account may be generated in association with the first requested service. For example, the first DEA may be generated based upon the first email address. For example, a portion of the first email address may be replaced with one or more characters (e.g., the first email address may be "jillhiggins@exampleemail.com" and/or the first DEA may be "4302higgins@exampleemail.com", "jillhig305@exampleemail.com", ji303iggins@exampleemail.com", etc.). Alternatively and/or additionally, one or more characters may be added to the first email address (e.g., the first email address may be "jillhiggins@exampleemail.com" and/or the first DEA may be "3928jillhiggins@exampleemail.com", "jillhiggins4032@exampleemail.com", etc.). Alternatively and/or additionally, the first DEA may comprise a (random) sequence of characters (e.g., letters, words and/or symbols) (e.g., the first DEA may be "k034950@exampleemail.com"). In some examples, the first DEA may be connected to the first email account via Internet Message Access Protocol (IMAP)-In.

At 410, a second email may be generated based upon the first email and/or the first DEA. For example, the second email may comprise an indication of the first DEA. In some examples, the first email may be modified to generate the second email. For example, the first email header of the first email may be modified to generate a second email header of the second email (e.g., the second email header may be different than the first email header). For example, the first sender address field (comprising the first email address) of the first email header may be modified to generate a second sender address field, of the second email header, comprising the first DEA. Alternatively and/or additionally, the first return-path field (comprising the first email address) of the first email header may be modified to generate a second return-path field, of the second email header, comprising the first DEA.

In some examples, a second subject field of the second email header may be similar (e.g., the same as) the first subject field of the first email header. Alternatively and/or additionally, a second email body of the second email may be generated based upon the first email body of the first email. For example, the second email body of the second email may be generated based upon content of the first email body. The second email body of the second email may comprise the content of the first email body.

At 412, the second email may be transmitted to a set of email accounts. Each email account of the set of email accounts may be associated with a service provider of the set of service providers associated with the first requested service. In some examples, the second email may be transmitted to the set of email accounts using email addresses associated with the set of service providers. The email addresses may be determined based upon sets of service provider information, in the database of service providers, associated with the set of service providers.

At 414, a third email, addressed to the first DEA, may be received from a second email account associated with a first service provider of the set of service providers associated with the first requested service. For example, the third email may comprise a third email header. The third email header of the third email may comprise a third recipient address field comprising an indication of the first DEA.

At 416, the third email may be transmitted to the first email account. For example, the third email may be transmitted to the first email account responsive to a determination that the first DEA corresponds to the first email account. For example, a DEA database may be analyzed based upon the first DEA to identify the first email account. For example, the DEA database may comprise a plurality of DEAs. Each DEA of the plurality of DEAs may be associated with an email account of a plurality of email accounts associated with the communication system. For example, each DEA of the plurality of DEAs may be tagged with an indication of an email account of the plurality of email accounts. The DEA database may be analyzed based upon the first DEA. The third email may be transmitted to the first email account responsive to identifying the first DEA and/or determining that the first DEA is tagged with an indication of the first email account.

Alternatively and/or additionally, each DEA of the plurality of DEAs may be tagged with a status tag. For example, a status tag may be indicative of a status of a corresponding DEA. For example, a status tag may be indicative of a DEA being associated with an active status where emails addressed to the DEA are transmitted to an email account corresponding to the DEA. Alternatively and/or additionally, a status tag may be indicative of a DEA being associated with a deactivated status where emails addressed to the DEA are not automatically transmitted to an email account corresponding to the DEA. For example, the third email may be transmitted to the first email account responsive to identifying the first DEA and/or determining that a first status tag associated with the first DEA is indicative of the first DEA being associated with an active status.

In some examples, a set of instructions (e.g., machine-readable instructions) may be transmitted to the first client device and/or to the first email account. For example, the set of instructions may be transmitted to the first email account via the third email (e.g., the set of instructions may be comprised within the third email). Alternatively and/or additionally, the set of instructions may be transmitted to the first client device and/or to the first email account separately from the third email.

The set of instructions may comprise instructions associated with emails that are addressed to the first DEA (e.g., emails having email headers comprising the first DEA within recipient address fields, such as the third email). For example, the set of instructions may indicate that response emails drafted and/or transmitted using the first email account, in response to emails that are addressed to the first DEA, shall include the first DEA within email headers of the response emails (e.g., an email header of a response email may comprise the first DEA within a sender address field of the email header and/or the first DEA within a return-path field of the email header). Alternatively and/or additionally, the set of instructions may indicate that response emails drafted and/or transmitted using the first email account, in response to emails that are addressed to the first DEA, shall not include the first email address within email headers of the response emails.

Alternatively and/or additionally, the set of instructions may indicate that emails, addressed to email accounts of the set of email accounts, shall include the first DEA within email headers of the emails (e.g., the set of instructions may comprise indications of the set of email accounts). Alternatively and/or additionally, the set of instructions may indicate that emails, addressed to one or more email accounts of the set of email accounts, shall not include the first email address within email headers of the emails.

For example, the third email may be displayed using the first email interface associated with the first email account. The first email interface may comprise a reply selectable input corresponding to composing a fourth email that is a response to the third email (e.g., the fourth email may be a response email associated with the third email). Responsive to a selection of the reply selectable input, one or more portions of a fourth email header associated with the fourth email may (automatically) be configured in accordance with the set of instructions (e.g., the one or more portions of the fourth email header may be populated in accordance with the set of instructions). For example, a fourth sender address field and/or a fourth return-path field of the fourth email header may be populated using the first DEA (in accordance with the set of instructions) (e.g., the first DEA may be entered into the fourth sender address field and/or the fourth return-path field of the fourth email header).

Alternatively and/or additionally, rather than configuring the one or more portions of the fourth email header (e.g., populating the one or more portions of the fourth email header) responsive to the selection of the reply selectable input, the one or more portions of the fourth email header may be configured (e.g., populated), in accordance with the set of instructions, responsive to a selection of a transmit selectable input. For example, the transmit selectable input may correspond to transmitting the fourth email to the second email address. In some examples, responsive to the selection of the transmit selectable input, the first email address may be removed from the fourth sender address field and/or the fourth return-path field of the fourth email header. Alternatively and/or additionally, responsive to the selection of the transmit selectable input, the fourth sender address field and/or the fourth return-path field of the fourth email header may be populated using the first DEA (e.g., the first DEA may be entered into the fourth sender address field and/or the fourth return-path field of the fourth email header).

In some examples, the set of instructions may not be transmitted to the first email account and/or to the first client device. Rather than using the first client device and/or the first email interface to modify the fourth email header and/or enter the first DEA into the fourth sender address field and/or the fourth return-path field of the fourth email header (and/or remove the first email address from the fourth email header), the fourth email may be modified to generate a fifth email using a server associated with the communication system (and/or the email service provider).

In some examples, the fourth email may be received (by the server associated with the communication system and/or the email service provider) responsive to a selection of the transmit selectable input. The fourth email may be analyzed to determine whether the fourth email comprises an indication of the first email address. For example, it may be determined that the fourth sender address field and/or the fourth return-path field of the fourth email header (of the fourth email) comprises the first email address.

Responsive to determining that the fourth email comprises the first email address (within the fourth email header) the fourth email may be modified, based upon the first DEA, to generate the fifth email. For example, a fifth email body of the fifth email may be similar to a fourth email body of the fourth email (e.g., the fourth email body may comprise content of the fifth email body). Alternatively and/or additionally, a fifth email header of the fifth email may be different than the fourth email header of the fourth email. For example, rather than a fifth sender address field and/or a fifth return-path field of the fifth email header comprising the first email address, the fifth sender address field and/or the fifth return-path field may comprise the first DEA.

In some examples, the fifth email may be transmitted to the second email account. Alternatively and/or additionally, responsive to determining that the fourth email comprises the first DEA (within the fourth email header) and/or does not comprise the first email address, the fourth email may be transmitted to the second email account (and/or the fifth email may not be generated).

At 418, a request to deactivate the first DEA may be received from the first client device associated with the first email account (e.g., and/or a different client device associated with the first client device). For example, the first client device may be used to display a deactivation interface (e.g., the deactivation interface may be a web page associated with the communication system, the deactivation interface may be comprised within a notification and/or an email, transmitted by the communication system, to the first email account, etc.). The deactivation interface may comprise a deactivate selectable input corresponding to requesting deactivation of the first DEA. For example, the request to deactivate the first DEA may be received responsive to a selection of the deactivate selectable input.

In some examples, one or more emails addressed to the first DEA and/or transmitted by email accounts of the set of email accounts may be analyzed to determine whether the first requested service is completed. For example, it may be determined that the first requested service is completed by identifying an email comprising a payment receipt associated with a payment by the first user in exchange for completion of the first requested service by a service provider of the set of service providers. Alternatively and/or additionally, it may be determined that the first requested service is completed by identifying an email comprising a confirmation of completion of the first requested service.

In some examples, responsive to determining that the first requested service is completed by a service provider of the set of service providers, the communication system (e.g., a server associated with the communication system) may transmit a first notification to the first client device. For example, the first notification may be a sixth email transmitted to the first email account. For example, the first notification may comprise a first deactivate selectable input. Responsive to a selection of the first deactivate selectable input, the request to deactivate the first DEA may be received (by the communication system).

Alternatively and/or additionally, a second notification may be transmitted to the first client device responsive to a determination that a first duration of time since a time that the first DEA was generated is greater than a first threshold duration of time (e.g., one week, one month, etc.). For example, the second notification may be a seventh email transmitted to the first email account. The second notification may be indicative of the first duration of time being greater than the first threshold duration of time (e.g., the second notification may comprise "The DEA for the plumbing services you requested was generated one month ago. Do you want to deactivate the DEA?"). Alternatively and/or additionally, the second notification may comprise a second deactivate selectable input. Responsive to a selection of the second deactivate selectable input, the request to deactivate the first DEA may be received.

Alternatively and/or additionally, a third notification may be transmitted to the first client device responsive to a determination that a second duration of time of email inactivity associated with the first DEA is greater than a second threshold duration of time. For example, the third notification may be an eighth email transmitted to the first email account. The second duration of time of email inactivity may correspond to a time in which an email addressed to the first DEA is not received by the first email account and/or the communication system (e.g., 0 emails addressed to the first DEA are received by the first email account and/or the communication system during the second duration of time of email inactivity). Alternatively and/or additionally, the second duration of time of email inactivity may correspond to a time in which an email is not transmitted to the set of email accounts by the first email account (e.g., 0 emails are transmitted by the first email account to the set of email accounts during the second duration of time of email activity).

For example, the third notification may be indicative of the second duration of time being greater than the second threshold duration of time (e.g., the third notification may comprise "You haven't received any emails addressed to the DEA for plumbing services and you haven't sent any emails to any of the service providers in over a month. Do you want to deactivate the DEA?"). The third notification may comprise a third deactivate selectable input. Responsive to a selection of the third deactivate selectable input, the request to deactivate the first DEA may be received.

Alternatively and/or additionally, a fourth notification may be transmitted to the first client device responsive to identifying one or more malicious emails addressed to the first DEA. For example, the fourth notification may be a ninth email transmitted to the first email account. The one or more malicious emails may be determined to be malicious based upon a determination that the one or more malicious emails match one or more emails stored in a database of malicious emails comprising emails previously marked as being malicious. Alternatively and/or additionally, the one or more malicious emails may be determined to be malicious based upon a determination that the one or more malicious emails comprise links to unsecure and/or malicious web pages (e.g., blacklisted web pages). For example, the fourth notification may be indicative of the one or more malicious emails (e.g., the ninth email may comprise "Malicious emails addressed to the DEA for plumbing services have been identified. It seems the DEA may be targeted by malicious entities. Do you want to deactivate the DEA?"). The fourth notification may comprise a fourth deactivate selectable input. Responsive to a selection of the fourth deactivate selectable input, the request to deactivate the first DEA may be received.

At 420, responsive to receiving the request to deactivate the first DEA, the first DEA may be deactivated. Alternatively and/or additionally, the first DEA may be deactivated (automatically) responsive to determining that the first requested service is completed (e.g., based upon one or more emails addressed to the first DEA). Alternatively and/or additionally, the first DEA may be deactivated (automatically) responsive to the determination that the first duration of time since the time that the first DEA was generated is greater than the first threshold duration of time. Alternatively and/or additionally, the first DEA may be deactivated (automatically) responsive to the determination that the second duration of time of email inactivity is greater than the second threshold duration of time. Alternatively and/or additionally, the first DEA may be deactivated (automatically) responsive to identifying the one or more malicious emails addressed to the first DEA.

In some examples, deactivating the first DEA may be associated with changing a status of the first DEA from active to deactivated. For example, the first status tag associated with the first DEA may be modified such that rather than the first status tag being indicative of the first DEA being associated with the active status, the first status tag may be indicative of the first DEA being associated with a deactivated status. Alternatively and/or additionally, deactivating the first DEA may be associated with removing the first DEA from the DEA database.

After deactivating the first DEA, a tenth email addressed to the first DEA may be received (by the communication system) from a third email account (e.g., the third email account may be an email account of the set of email accounts). In some examples, the tenth email may be discarded responsive to a determination that the first DEA is deactivated. For example, the DEA database may be analyzed to identify the first status tag, indicative of the first DEA having the deactivated status. Alternatively and/or additionally, the DEA database may be analyzed and/or it may be determined that the first DEA is deactivated based upon a determination that the first DEA is not comprised within the DEA database.

Alternatively and/or additionally, responsive to the determination that the first DEA is deactivated, a fifth notification may be generated and/or transmitted to the first client device. For example, the fifth notification may be an eleventh email transmitted to the first email account. The fifth notification may comprise an indication of the third email account (associated with the tenth email). The fifth notification may comprise a first selectable input corresponding to a request to be provided with the tenth email. Alternatively and/or additionally, the fifth notification may comprise a second selectable input corresponding to a request to not be provided with the tenth email.

In some examples, responsive to a selection of the first selectable input (corresponding to the request to be provided with the tenth email), the tenth email may be transmitted to the first email account. Alternatively and/or additionally, responsive to the selection of the first selectable input, the first DEA may be activated. For example, the first status tag associated with the first DEA may be modified such that rather than the first status tag being indicative of the first DEA having the deactivated status, the first status tag may be indicative of the first DEA having the active status.

In some examples, after receiving the selection of the first selectable input, a twelfth email addressed to the first DEA may be received (by the communication system) from a fourth email account (e.g., the fourth email account may be an email account of the set of email accounts). In some examples, the twelfth email may be (automatically) transmitted to the first email account based upon the selection of the first selectable input of the fifth notification. For example, the twelfth email may be transmitted to the first email account responsive to a determination that the first DEA is active (e.g., the first status tag is indicative of the first DEA being associated with the active status).

Alternatively and/or additionally, responsive to a selection of the second selectable input of the fifth notification (corresponding to the request to not be provided with the tenth email), the tenth email may be discarded. For example, the status of the first DEA may remain deactivated. Alternatively and/or additionally, the status of the first DEA may be change from deactivated to permanently deactivated. For example, the first status tag associated with the first DEA may be modified such that rather than the first status being indicative of the first DEA being associated with the deactivated status, the first status tag may be indicative of the first DEA being associated with a permanently deactivated status.

In some examples, after receiving the selection of the second selectable input, a thirteenth email addressed to the first DEA may be received (by the communication system) from a fifth email account (e.g., the fifth email account may be an email account of the set of email accounts). In some examples, the thirteenth email may be discarded based upon the selection of the second selectable input of the fifth notification. Alternatively and/or additionally, the thirteenth email may be discarded responsive to a determination that the first DEA is permanently deactivated (e.g., that the first status tag is indicative of the first DEA being associated with the permanently deactivated status).

It may be appreciated that one or more of the techniques presented herein may be implemented using a communication platform different than an email platform (e.g., text messaging, messaging platforms, social media platforms, etc.). For example, using one or more of the techniques presented herein, a requested service may be determined based upon a first message (e.g., a text message, an instant message, etc.) received from a client device. A set of service providers may be determined based upon the requested service. A DEA may be generated corresponding to the client device, in association with the requested service. A first email may be generated based upon the first message (e.g., content of the first email may comprise content of the first message). The first email may be transmitted to a set of email accounts. Each email account of the set of email accounts may be associated with a service provider of the set of service providers associated with the requested service.

In some examples, one or more emails, addressed to the DEA, may be received from the set of email accounts (by the communication system). For example, one or more messages corresponding to the one or more emails may be generated (e.g., each message of the one or more messages may comprise content of an email of the one or more emails). In some examples, the one or more messages may be transmitted to the client device.

For example, a second email, addressed to the DEA, may be received from a first email account of the set of email accounts (e.g., the first email account of the set of email accounts may be associated with a first service provider of the set of service providers). A second message, corresponding to the second email, may be generated based upon the second email (e.g., the second message may comprise content of the second email). The second message may be transmitted to the client device. In some examples, the second message may be a text message (e.g., associated with short message service (SMS), multimedia messaging service (MMS), etc.) and/or may be associated with a telephone number. For example, the telephone number may be a return number of the second message. For example, the second message may be displayed using the client device. The second message may be displayed using a text messaging interface and/or the text messaging interface may be indicative of the telephone number associated with the second message.

In some examples, the client device may be used to transmit a third message to the telephone number. For example, the third message may be a text message addressed to the telephone number. In some examples, the communication system may receive the third message. For example, the telephone number may be identified and/or may be compared with a telephone number database comprising a plurality of telephone numbers and/or a plurality of email accounts associated with the plurality of telephone numbers. For example, it may be determined that the telephone number is associated with the first email account (associated with the first service provider). A third email may be generated based upon the third message. The third email may be transmitted to the first email account.

In some examples, the one or more emails addressed to the DEA may be analyzed to determine whether the requested service is completed. For example, responsive to a determination that the requested service is completed, the DEA may be deactivated. Alternatively and/or additionally, a notification may be transmitted to the client device. For example, the notification may comprise a link to a web page comprising a deactivate interface. For example, the deactivate interface may comprise a deactivate selectable input corresponding to requesting deactivation of the DEA. For example, responsive to a selection of the deactivate selectable input, a request to deactivate the DEA may be received (by the communication system) and/or the DEA may be deactivated.

FIGS. 5A-5I illustrate examples of a system 501 for facilitating communications with service providers using DEAs. A first user, such as user Sam and/or a first client device 550 (illustrated in FIG. 5D) associated with the first user may access and/or interact with a communication system (and/or an email system, messaging system, etc.) for sending and/or receiving emails and/or performing communications via messaging, voice calls, video calls, etc. For example, a first email account (and/or a different type of user account) of the first user with the communication system may be accessed and/or interacted with via a first email interface, such as an email client, a web email interface accessed via a browser, an email application, etc. on the first client device 550. In some examples, the communication system may be associated with an email service provider.

Figure 5A:
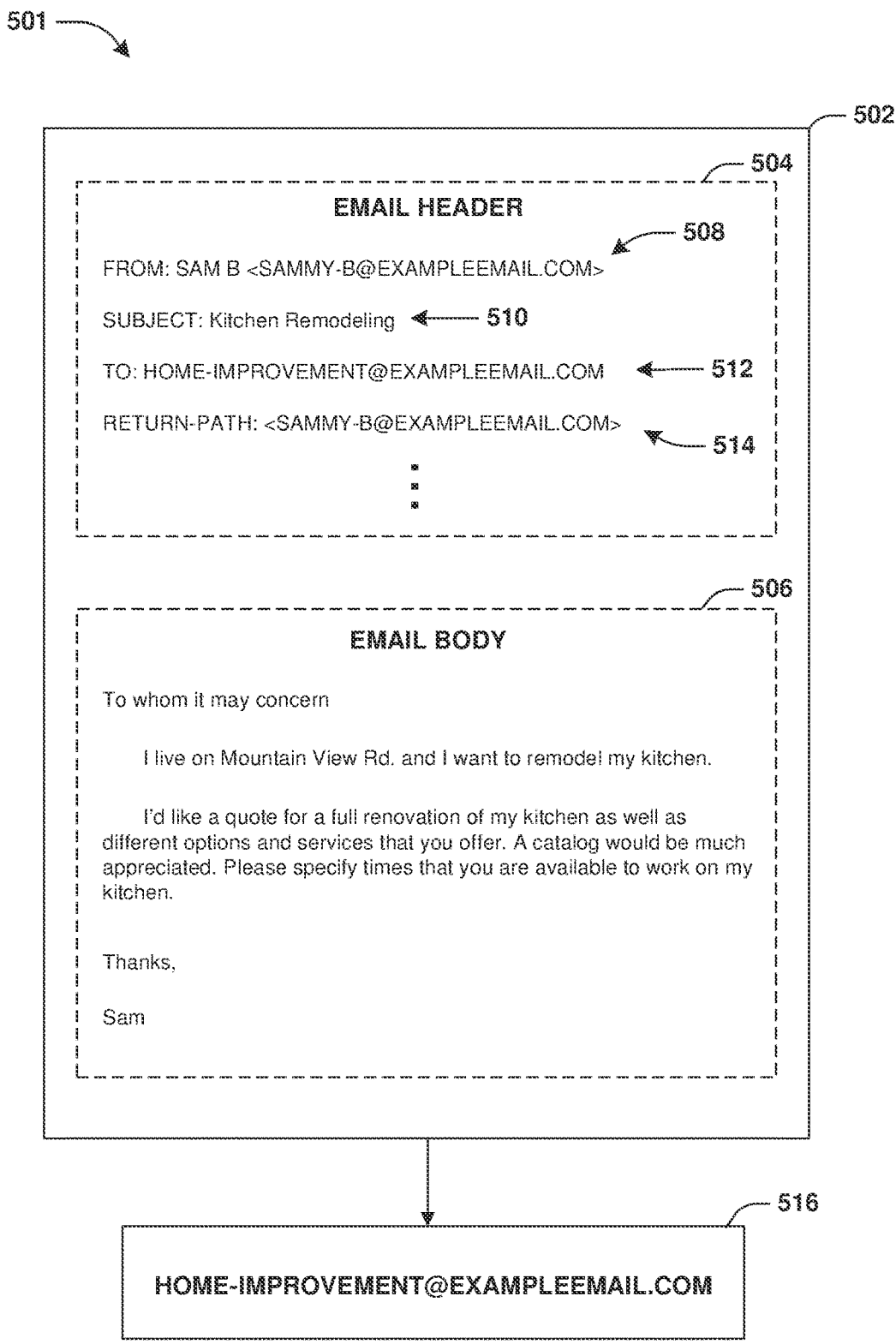
FIG. 5A is a component block diagram illustrating an example system for facilitating communications with service providers using DEAs, where a first email is received from a first email account.

FIG. 5A illustrates a first email 502 being received from the first email account. For example, the first email 502 may comprise a first email header 504 and/or a first email body 506. The first email header 504 may comprise a plurality of email header fields. For example, the first email header 504 may comprise a first sender address field 508 comprising a sender name "SAM B" associated with the first email account and/or a first email address "SAMMY-B@EXAMPLEEMAIL.COM" associated with the first email account. Alternatively and/or additionally, the first email header 504 may comprise a first subject field 510 comprising a first subject "Kitchen Remodeling" of the first email 502. Alternatively and/or additionally, the first email header 504 may comprise a first recipient address field 512 comprising a second email address 516 "HOME-IMPROVEMENT@EXAMPLEEMAIL.COM" associated with the communication system. Alternatively and/or additionally, the first email header 504 may comprise a first return-path field 514 comprising the first email address.

In some examples, the first email body 506 may comprise content (e.g., text, one or more images, etc.) related to a first requested service associated with the first email 502. For example, the first email body may comprise text, composed using the first email interface, which may comprise a description of the first requested service.

The first email may be transmitted to the second email address 516. For example, the second email address 516 may be associated with a first service topic "home improvement services". For example, the first requested service may be determined to be a home improvement service based upon the first email being transmitted to the second email address 516. Alternatively and/or additionally, the first email body 506 and/or the first subject field 510 may be analyzed to determine the first requested service. For example, the first requested service may be determined to be "kitchen remodeling service" based upon the first email body 506 and/or the first subject field 510.

In some examples, a set of service providers may be determined based upon the first requested service. For example, each service provider of the set of service providers may provide kitchen remodeling services. The set of service providers may be determined based upon a client location associated with the first user and/or the first email account. For example, each service provider of the set of service providers may be associated with a location that is within a threshold distance from the client location.

Figure 5B:
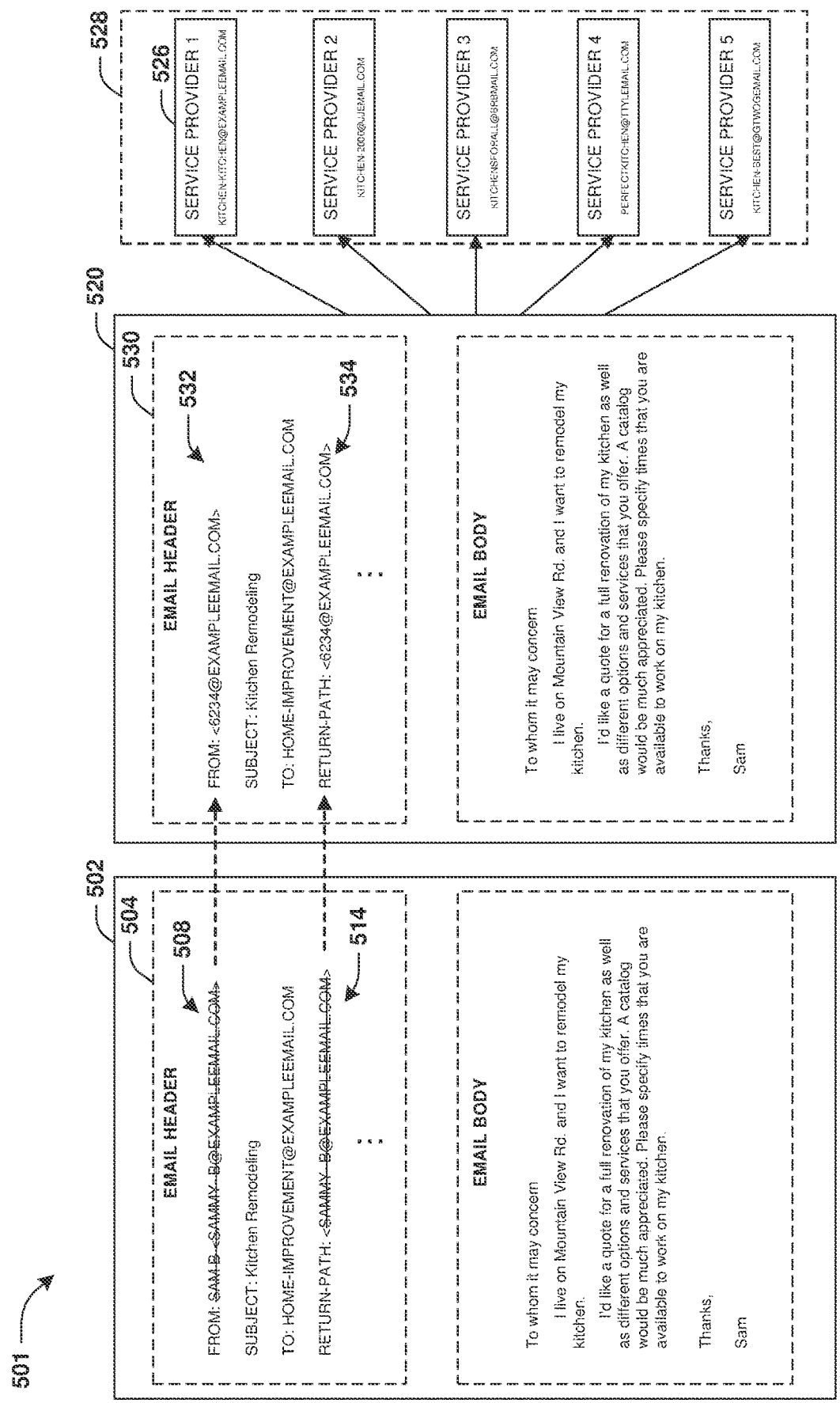
FIG. 5B is a component block diagram illustrating an example system for facilitating communications with service providers using DEAs, where a second email is generated based upon a first email and/or a first DEA corresponding to a first email account.

FIG. 5B illustrates a second email 520 being generated based upon the first email 502 and/or a first DEA corresponding to the first email account. In some examples, the first DEA "6234@EXAMPLEEMAIL.COM" may be generated in association with the first requested service. In some examples, the first email 502 may be modified to generate the second email 520. For example, the first email header 504 may be modified to generate a second email header 530 of the second email 520.

In some examples, the first sender address field 508 (comprising the first email address) may be modified to generate a second sender address field 532, of the second email header 530, comprising the first DEA. Alternatively and/or additionally, the first return-path field 514 (comprising the first email address) may be modified to generate a second return-path field 534, of the second email header 530, comprising the first DEA.

In some examples, the second email 520 may be transmitted to a set of email accounts 528. Each email account of the set of email accounts 528 may be associated with a service provider of the set of service providers associated with the first requested service. For example, the second email 520 may be transmitted to a second email account 526 of the set of email accounts 528. For example, the second email account 526 may be associated with a first service provider "SERVICE PROVIDER 1" of the set of service providers.

Figure 5C:
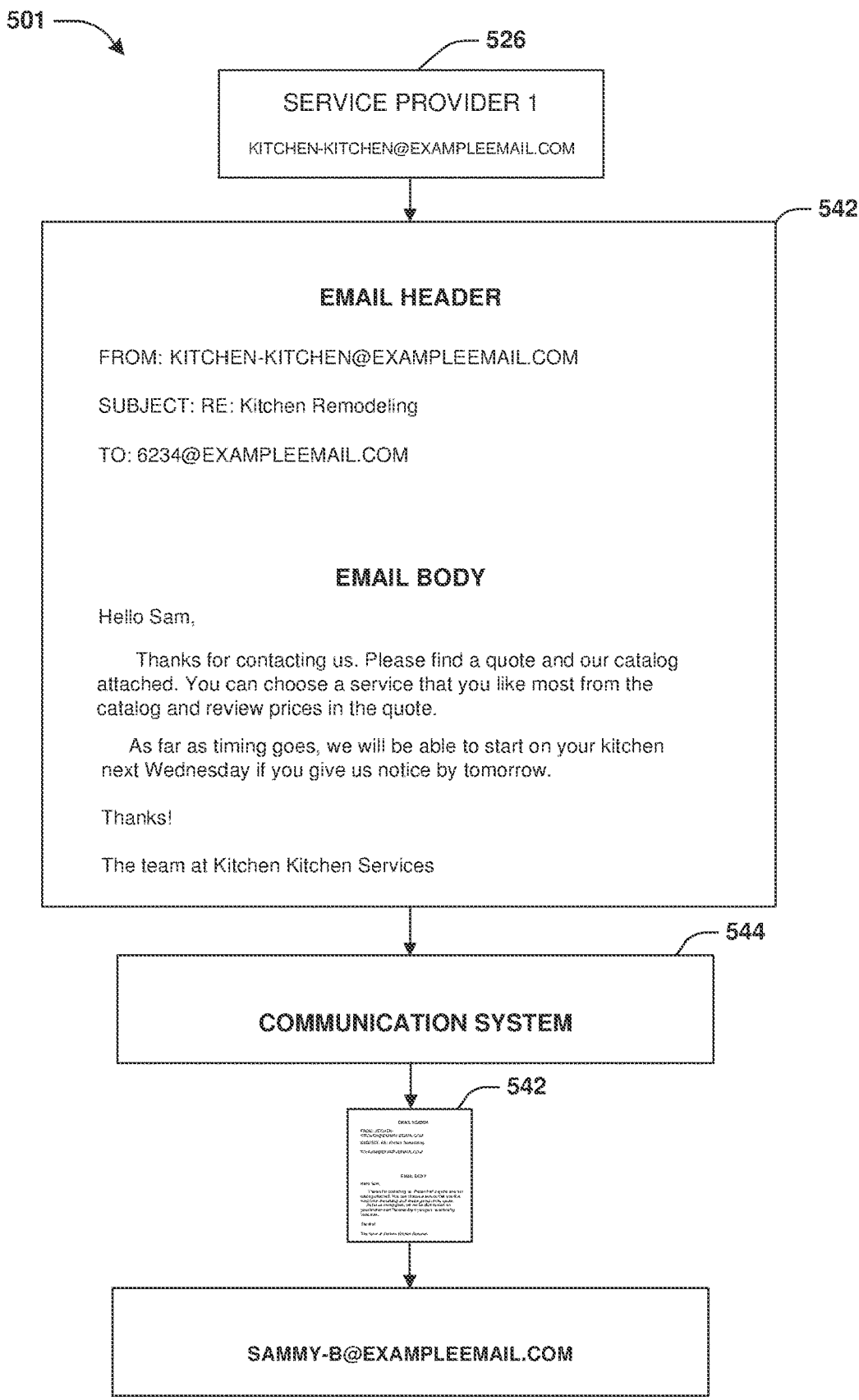
FIG. 5C is a component block diagram illustrating an example system for facilitating communications with service providers using DEAs, where a third email is transmitted to a first email account.

FIG. 5C illustrates a third email 542 being transmitted to the first email account. For example, the third email 542 may be transmitted by the second email account 526. The third email 542 may be addressed to the first DEA (e.g., a third email header of the third email 542 may comprise a third recipient address field comprising an indication of the first DEA). In some examples, the third email 542 may be received by a server 544 associated with the communication system and/or the email service provider. For example, the third email 542 may be transmitted to the first email account by the communication system and/or the email service provider (e.g., by the server 544) responsive to a determination that the first DEA corresponds to the first email account.

Figure 5D:
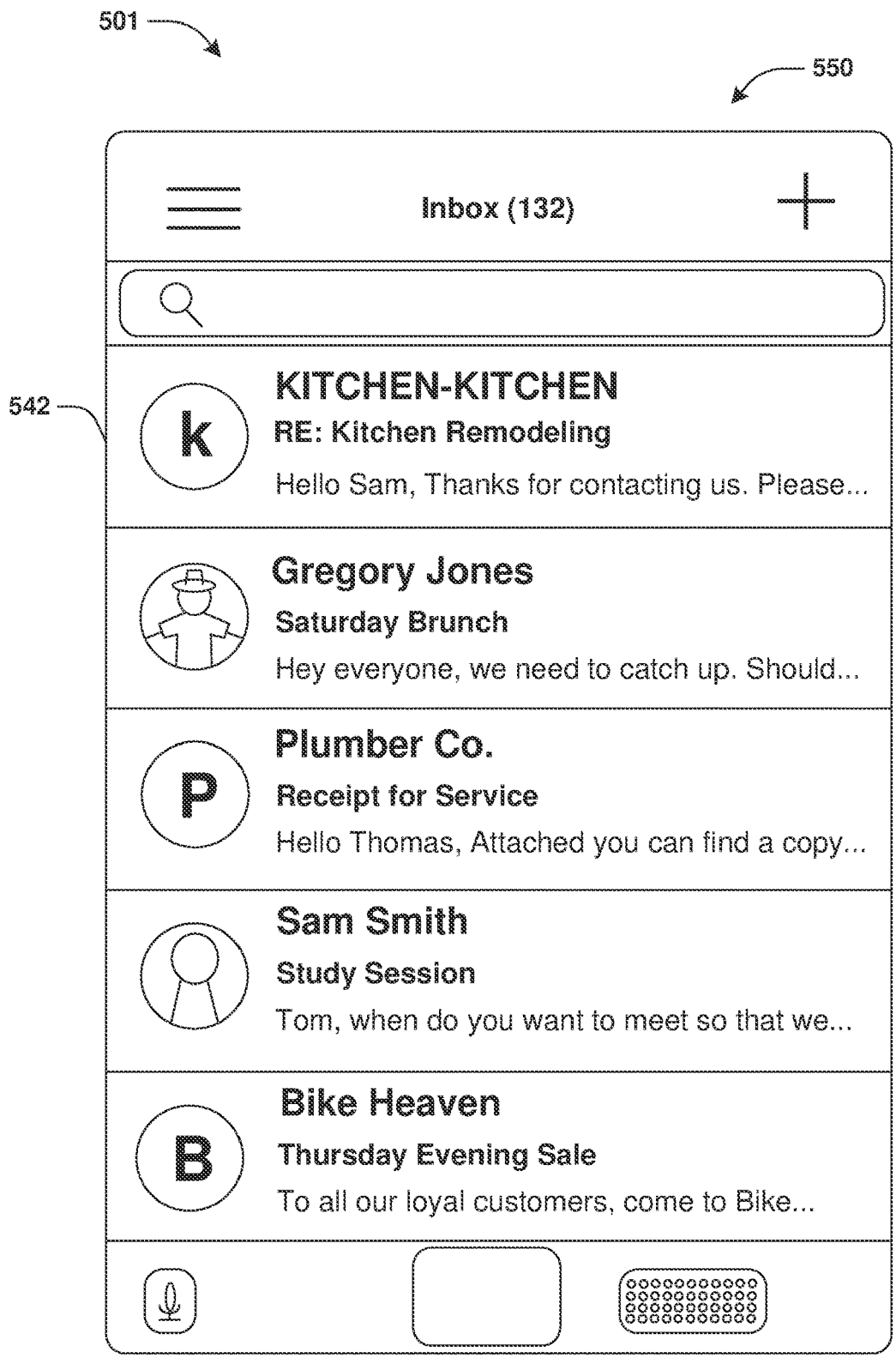
FIG. 5D is a component block diagram illustrating an example system for facilitating communications with service providers using DEAs, where a graphical user interface of a first client device is controlled to display a first email interface.

FIG. 5D illustrates a graphical user interface of the first client device 550 being controlled to display the first email interface. For example, the first email interface may display a list of emails. The list of emails may correspond to an inbox of the first email account. The list of emails may comprise the third email 542. For example, a selection of the third email 542 may be received via the first email interface.

Figure 5E:
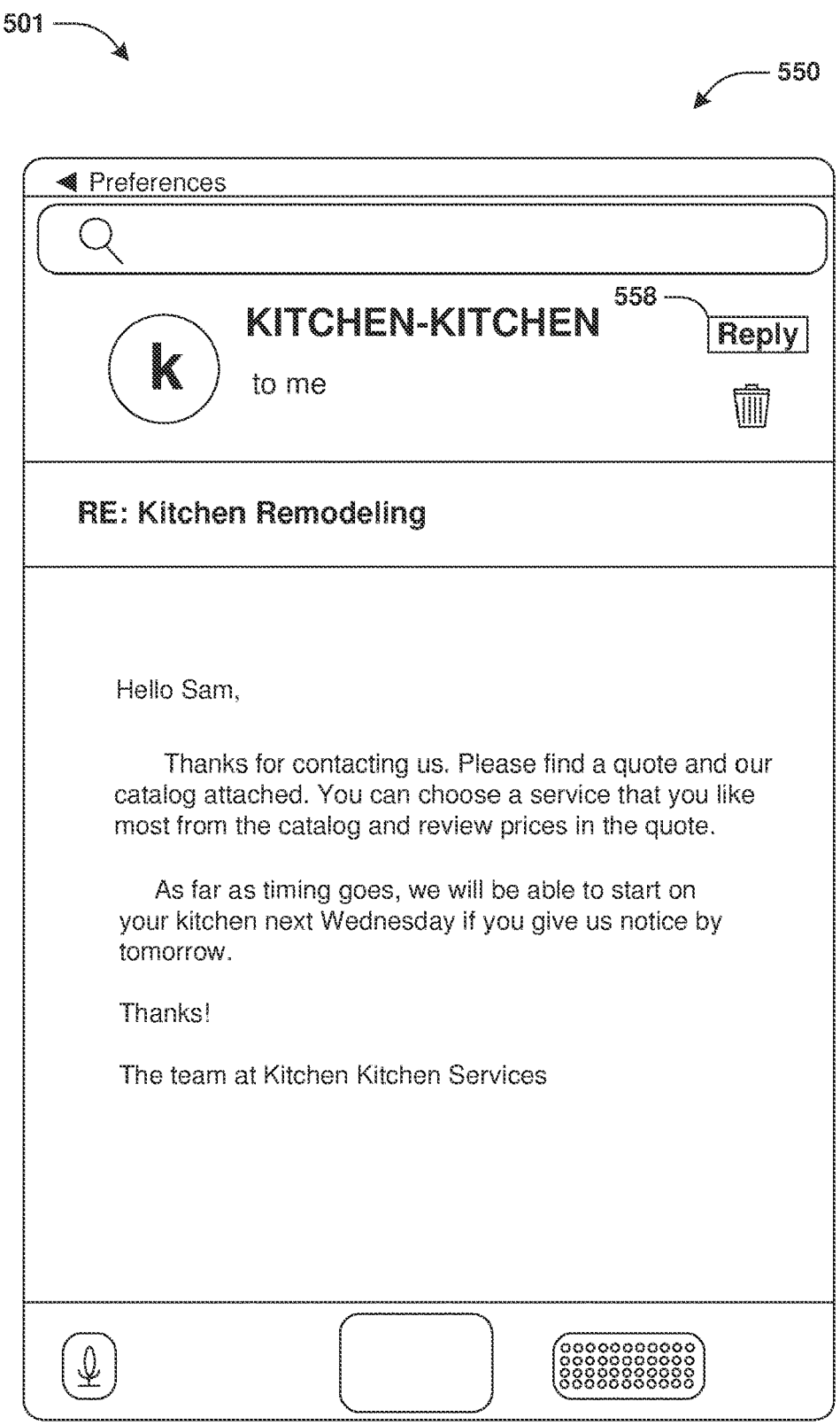
FIG. 5E is a component block diagram illustrating an example system for facilitating communications with service providers using DEAs, where a graphical user interface of a first client device is controlled to display a third email.

FIG. 5E illustrates the graphical user interface of the first client device 550 being controlled to display the third email 542. For example, the third email 542 may be displayed responsive to the selection of the third email 542 from the list of emails. In some examples, the first email interface may comprise a reply selectable input 558 corresponding to composing a fourth email 564 (illustrated in FIG. 5F) that is a response to the third email 542.

Responsive to a selection of the reply selectable input 558, an email drafting interface may be displayed. For example, the fourth email 564 may be drafted using the email drafting interface. Alternatively and/or additionally, the fourth email 564 may be transmitted to the communication system responsive to a selection of a transmit selectable input of the email drafting interface. For example, the fourth email 564 may be received from the first email account and/or the first client device 550 responsive to a selection of the transmit selectable input.

FIG. 5F illustrates a fifth email 566 being generated based upon the fourth email 564 and/or the first DEA corresponding to the first email account. In some examples, the fourth email 564 may be modified to generate the fifth email 566. For example, a fourth email header of the fourth email 564 may be modified to generate a fifth email header of the fifth email 566.

In some examples, a fourth sender address field (comprising the first email address) of the fourth email header may be modified to generate a fifth sender address field, of the fifth email header, comprising the first DEA. Alternatively and/or additionally, a fourth return-path field (comprising the first email address) of the fourth email header may be modified to generate a fifth return-path field, of the fifth email header, comprising the first DEA. The fifth email 566 may be transmitted to the second email account 526 (by the communication system).

Figure 5G:
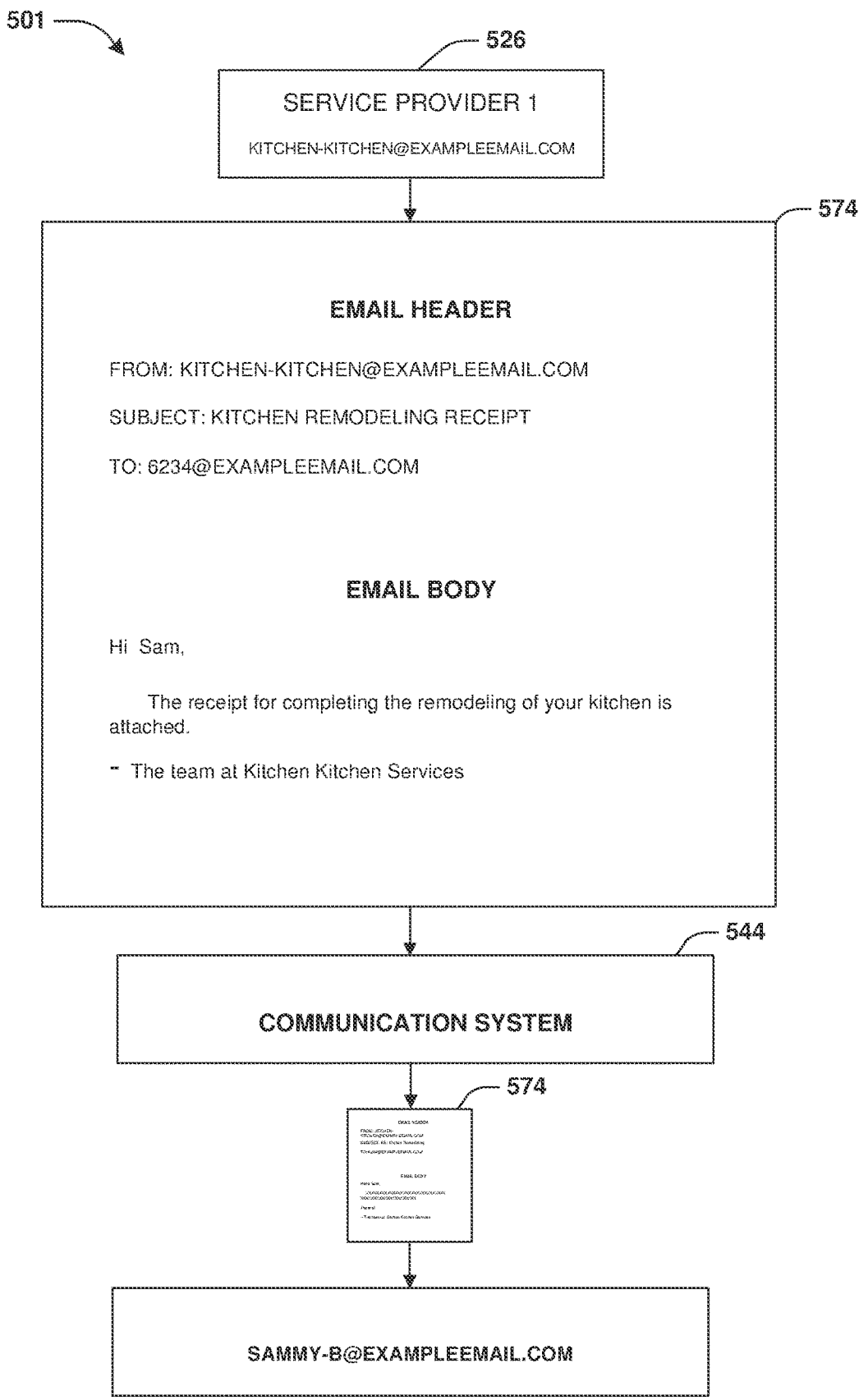
FIG. 5G is a component block diagram illustrating an example system for facilitating communications with service providers using DEAs, where a sixth email is transmitted to a first email account.

FIG. 5G illustrates a sixth email 574 being transmitted to the first email account. For example, the sixth email 574 may be transmitted by the second email account 526. The sixth email 574 may be addressed to the first DEA (e.g., a sixth email header of the sixth email 574 may comprise a sixth recipient address field comprising an indication of the first DEA). In some examples, the sixth email 574 may be received by the server 544 (and/or a different server) associated with the communication system and/or the email service provider. For example, the sixth email 574 may be transmitted to the first email account (by the communication system and/or the email service provider) responsive to a determination that the first DEA corresponds to the first email account.

In some examples, the sixth email 574 may be analyzed to determine whether the first requested service is completed. For example, it may be determined that the first requested service is completed by identifying that the sixth email 574 comprises a payment receipt associated with a payment by the first user in exchange for completion of the first requested service by the first service provider. In some examples, responsive to determining that the first requested service is completed by the first service provider, the communication system (e.g., a server associated with the communication system) may transmit a seventh email 582 to the first email account.

Figure 5H:
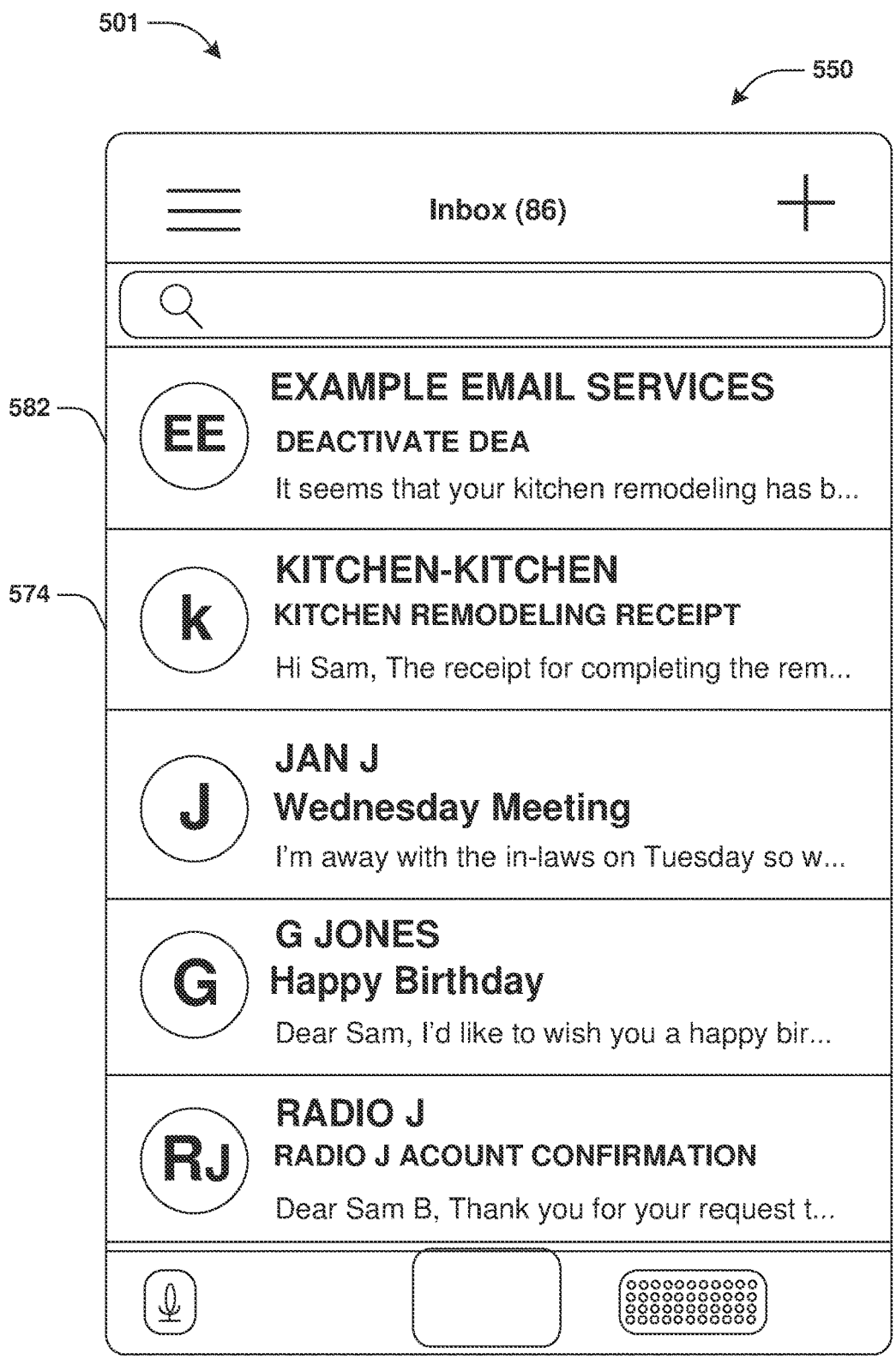
FIG. 5H is a component block diagram illustrating an example system for facilitating communications with service providers using DEAs, where a graphical user interface of a first client device is controlled to display a first email interface comprising a second list of emails.

FIG. 5H illustrates the graphical user interface of the first client device 550 being controlled to display the first email interface comprising a second list of emails. The second list of emails may correspond to the inbox of the first email account. The second list of emails may comprise the sixth email 574. Alternatively and/or additionally, the second list of emails may comprise the seventh email 582. For example, a selection of the seventh email 582 may be received via the first email interface.

Figure 5I:
FIG. 5I is a component block diagram illustrating an example system for facilitating communications with service providers using DEAs, where a graphical user interface of a first client device is controlled to display a seventh email.

FIG. 5I illustrates the graphical user interface of the first client device 550 being controlled to display the seventh email 582. For example, the seventh email 582 may be displayed responsive to the selection of the seventh email 582 from the second list of emails. In some examples, the seventh email 582 may comprise a deactivate selectable input 592 corresponding to a request to deactivate the first DEA. Alternatively and/or additionally, the seventh email 582 may comprise an activate selectable input 594 corresponding to a request to not deactivate the first DEA. In some examples, the deactivate selectable input 592 may be selected. For example, responsive to the deactivate selectable input 592 being selected, a request to deactivate the first DEA may be received. For example, the first DEA may be deactivated responsive to receiving the request to deactivate the first DEA.

It may be appreciated that the disclosed subject matter may assist a user (e.g., and/or a client device associated with the user) in receiving service information, associated with one or more services of interest to the user, from multiple service providers.

Implementation of at least some of the disclosed subject matter may lead to benefits including, but not limited to, a reduction in screen space and/or an improved usability of a display (of the client device) (e.g., as a result of automatically identifying a set of service providers associated with a requested service of interest to the user, wherein the user may not need to open a separate application and/or a separate window in order to find service providers associated with the requested service, wherein the user may not need to use search engines and/or navigate through internet content in order to search for service providers associated with the requested service, etc.).

Alternatively and/or additionally, implementation of at least some of the disclosed subject matter may lead to benefits including a reduction in screen space and/or an improved usability of the display (e.g., as a result of receiving a first email from a first email account associated with the user, as a result of transmitting an email related to the first email to email accounts associated with the set of service providers, wherein the user may not need to send an email to each email account separately, wherein the user may not need to find email addresses corresponding to each service provider of the set of service providers, wherein the user may not need to enter each email address into an email interface for transmission of the first email, etc.).

Alternatively and/or additionally, implementation of at least some of the disclosed subject matter may lead to benefits including a reduction in screen space and/or an improved usability of the display (e.g., as a result of generating a DEA corresponding to the first email account, as a result of using the DEA for email correspondences between the user and the set of service providers, wherein the user may not be required to disclose a first email address associated with the first email account, wherein service providers of the set of service providers may be prevented from sending unwanted and/or undesirable emails to the first email account by deactivating the DEA, wherein the user may not need to scroll through unwanted and/or undesirable emails to consume (desirable) emails, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find service providers associated with the requested service).

Alternatively and/or additionally, implementation of at least some of the disclosed subject matter may lead to benefits including a reduction in bandwidth (e.g., as a result of preventing the set of service providers from sending unwanted and/or undesirable emails to the first email account by deactivating the DEA, such that the unwanted and/or undesirable emails are not downloaded to the client device).

Alternatively and/or additionally, implementation of at least some of the disclosed subject matter may lead to benefits including more accurate and precise transmission of content to intended users (e.g., as a result of preventing the set of service providers from sending unwanted and/or undesirable emails to the first email account by deactivating the DEA, such that the unwanted and/or undesirable emails are not downloaded to the client device and/or merely wanted and/or desirable emails may be sent to the first email account and/or downloaded to the client device).

Alternatively and/or additionally, implementation of at least some of the disclosed subject matter may lead to benefits including a faster loading of content on a receiving device. For example, by reducing undesirable emails transmitted to the first email account and/or by reducing undesirable content associated with the undesirable emails downloaded to the client device, as provided for herein, content may be downloaded to the client device at an increased speed, and thus delay between a determination to transmit content and completion of transmission of the content and/or presenting of the content can be reduced.

Alternatively and/or additionally, implementation of at least some of the disclosed subject matter may lead to benefits including protecting user privacy and/or preventing unauthorized access to personal information associated with the user (e.g., as a result of enabling the user to receive service information associated with the requested service and/or the set of service providers without being required to provide personal information to the set of service providers, etc.). Alternatively and/or additionally, implementation of at least some of the disclosed subject matter may lead to benefits including decreasing security resources needed to protect the personal information from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 6:
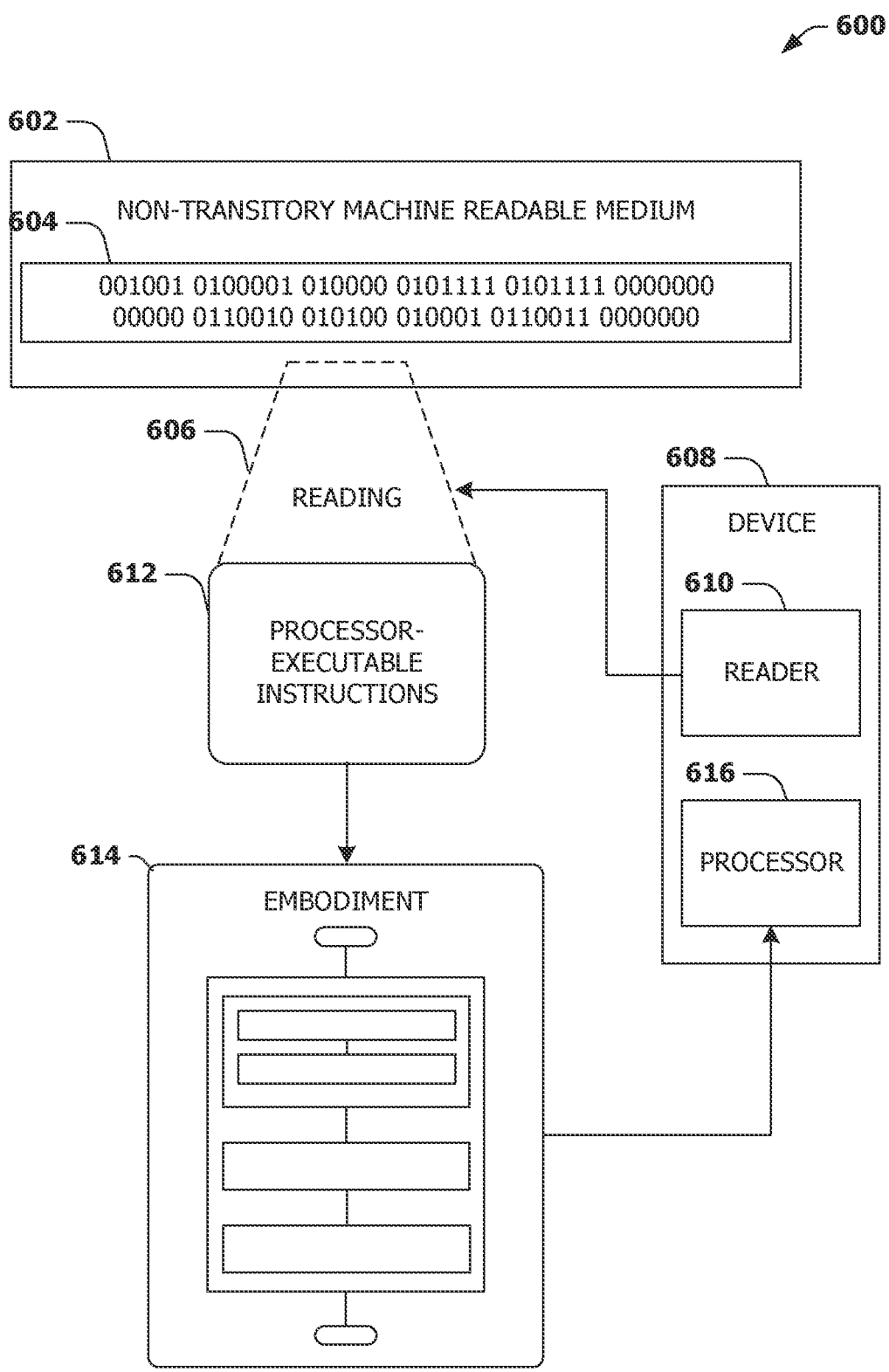
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method performed by a communication system, the method comprising:

receiving a first email from a first email account, wherein the first email comprises an indication of a first email address of the first email account;
determining a requested service based upon the first email;
determining a location associated with the first email account;
determining a set of service providers corresponding to the requested service based upon the requested service determined based upon the first email and the location, wherein the determining the set of service providers comprises selecting a first service provider, for inclusion in the set of service providers, from a database of service providers based upon:
  a determination that at least one service associated with the first service provider at least one of matches or is related to the requested service determined based upon the first email; and
  a determination that the first service provider is within a threshold distance from the location; and
responsive to the first email, automatically and without user intervention:
  generating a first disposable email address (DEA), corresponding to the first email account, for one or more communications corresponding to the requested service determined based upon the first email;
  generating a second email based upon (i) the first DEA and (ii) the first email received from the first email account and used to determine the requested service, wherein the generating the second email comprises including, in the second email, an indication of the first DEA as a sender of the second email; and
  responsive to generating the second email, transmitting the second email to a set of email accounts comprising a second email account of the first service provider, wherein each email account of the set of email accounts is for a service provider selected for inclusion in the set of service providers corresponding to the requested service.

2. The method of claim 1, comprising:
receiving a third email, addressed to a second email address associated with the second email account, from the first email account; and
transmitting a fourth email, associated with the third email, to the second email account, wherein the fourth email comprises an indication of the first DEA.

3. The method of claim 2, wherein the fourth email is the same as the third email.

4. The method of claim 2, comprising:
determining whether the third email comprises an indication of the first email address; and
responsive to determining that the third email comprises the indication of the first email address, modifying the third email based upon the first DEA to generate the fourth email.

5. The method of claim 1, wherein the generating the second email based upon the first email comprises:
generating a second email body of the second email based upon content of a first email body of the first email, wherein the second email body of the second email comprises the content of the first email body of the first email; and
generating a second email header of the second email, wherein the second email header comprises a sender address corresponding to the first DEA, wherein the second email header of the second email is different than a first email header of the first email.

6. The method of claim 1, wherein the database of service providers comprises at least one of:
a geolocation associated with the first service provider; or
a service region in which the first service provider provides services.

7. The method of claim 1, comprising:
responsive to determining that the requested service is completed by the first service provider, transmitting a notification to a client device associated with the first email account, wherein the notification comprises a first selectable input corresponding to deactivating the first DEA.

8. The method of claim 7, wherein a request to deactivate the first DEA is received responsive to a selection of the first selectable input.

9. The method of claim 1, comprising:
deactivating the first DEA;
after the deactivating the first DEA, receiving a third email, addressed to the first DEA; and
responsive to receiving the third email, discarding the third email.

10. The method of claim 1, comprising:
deactivating the first DEA;
after the deactivating the first DEA, receiving a third email, addressed to the first DEA, from a third email account;
responsive to receiving the third email, generating a fourth email, wherein:
  the fourth email comprises an indication of the third email account; and
  the fourth email comprises a first selectable input corresponding to a request to be provided with the third email; and
transmitting the fourth email to the first email account.

11. The method of claim 10, comprising:
receiving a selection of the first selectable input; and
responsive to receiving the selection of the first selectable input, transmitting the third email to the first email account.

12. The method of claim 10, wherein the fourth email comprises a second selectable input corresponding to a request to not be provided with the third email, the method comprising:
receiving a selection of the second selectable input; and
responsive to receiving the selection of the second selectable input, discarding the third email.

13. The method of claim 12, comprising:
after receiving the selection of the second selectable input in the fourth email, receiving a fifth email, addressed to the first DEA; and
responsive to receiving the fifth email, discarding the fifth email based upon the selection of the second selectable input.

14. The method of claim 11, comprising:
after receiving the selection of the first selectable input in the fourth email, receiving a fifth email, addressed to the first DEA; and
responsive to receiving the fifth email, transmitting the fifth email to the first email account.

15. A computing device comprising:
a processor; and
memory comprising processor-executable instructions that when executed by the processor cause performance of operations, the operations comprising:
  receiving a first message from a first client device;

determining a requested service based upon the first message;

determining a location associated with the first client device;

determining a set of service providers corresponding to the requested service based upon the requested service determined based upon the first message and the location, wherein the determining the set of service providers comprises selecting a first service provider, for inclusion in the set of service providers, from a database of service providers based upon:

a determination that at least one service associated with the first service provider at least one of matches or is related to the requested service determined based upon the first message; and a determination that the first service provider is within a threshold distance from the location; and responsive to the first message, automatically and without user intervention:

generating, by a communication system, a first disposable email address (DEA), corresponding to the first client device, for one or more communications corresponding to the requested service determined based upon the first message;

generating, by the communication system, a first email based upon (i) the first DEA and (ii) the first message received from the first client device and used to determine the requested service, wherein the generating the first email comprises including, in the first email, an indication of the first DEA as a sender of the first email; and responsive to generating the first email, transmitting, by the communication system, the first email to a set of email accounts comprising a first email account of the first service provider, wherein each email account of the set of email accounts is for a service provider selected for inclusion in the set of service providers corresponding to the requested service.

16. The computing device of claim 15, wherein:
the first message is a first text message.

17. The computing device of claim 16, the operations comprising:

receiving a second text message, addressed to a first return number associated with the first email account, from the first client device;

generating a second email based upon the second text message, wherein the second email comprises an indication of the first DEA; and transmitting the second email to the first email account.

18. A non-transitory machine readable medium having stored thereon processor-executable instructions that when executed cause performance of operations, the operations comprising:

receiving a first email from a first email account, wherein the first email comprises an indication of a first email address of the first email account;

determining a requested service based upon the first email;

determining a location associated with the first email account;

determining a set of service providers corresponding to the requested service based upon the requested service determined based upon the first email and the location, wherein the determining the set of service providers comprises selecting a first service provider, for inclusion in the set of service providers, from a database of service providers based upon:

a determination that at least one service associated with the first service provider at least one of matches or is related to the requested service determined based upon the first email; and a determination that the first service provider is within a threshold distance from the location; and responsive to the first email, automatically and without user intervention:

generating, by a communication system, a first disposable email address (DEA), corresponding to the first email account, for one or more communications corresponding to the requested service determined based upon the first email;

generating, by the communication system, a second email based upon (i) the first DEA and (ii) the first email used to determine the requested service, wherein the second email comprises an indication of the first DEA as a sender of the second email; and transmitting, by the communication system, the second email to a set of email accounts comprising a second email account of the first service provider, wherein each email account of the set of email accounts is for a service provider selected for inclusion in the set of service providers corresponding to the requested service.

19. The non-transitory machine readable medium of claim 18, wherein the generating the second email based upon the first email comprises:

generating a second email body of the second email based upon content of a first email body of the first email, wherein the second email body of the second email comprises the content of the first email body of the first email; and generating a second email header of the second email, wherein the second email header comprises a sender address corresponding to the first DEA, wherein the second email header of the second email is different than a first email header of the first email.

20. The non-transitory machine readable medium of claim 18, wherein the database of service providers comprises at least one of:

a geolocation associated with the first service provider; or
a service region in which the first service provider provides services.

* * * * *